US005477285A

United States Patent [19]

Riddle et al.

[11] Patent Number: 5,477,285

[45] Date of Patent: Dec. 19, 1995

[54] CRT DEVELOPING APPARATUS

[75] Inventors: George H. N. Riddle, Princeton; Pabitra Datta, West Windsor; Ronald N. Friel, Hamilton Square, all of N.J.; Dennis R. McCarthy, Jamison; John J. Moscony, Lancaster, both of Pa.; Eugene S. Poliniak, Willingboro, N.J.; Peter M. Ritt, East Petersburg, Pa.; Robert E. Simms, Cream Ridge; Carl C. Steinmetz, Mercerville, both of N.J.; Harry R. Stork, Adamstown; Charles M. Wetzel, Lititz, both of Pa.

[73] Assignee: Thomson Consumer Electronics, Inc., Indianapolis, Ind.

[21] Appl. No.: 132,263

[22] Filed: Oct. 6, 1993

[51] Int. Cl.$^{6}$ .............................. G03B 41/00; G03C 5/00

[52] U.S. Cl. .................................... 354/1; 430/23; 430/30

[58] Field of Search .................................. 354/1; 430/23, 430/28, 30

[56] References Cited

U.S. PATENT DOCUMENTS

| | | | |
|---|---|---|---|
| 2,808,023 | 10/1957 | Hayford | 118/637 |
| 3,479,711 | 11/1969 | Heil | 29/25.13 |
| 3,558,310 | 1/1971 | Mayaud | 96/36.1 |
| 3,571,897 | 3/1971 | Heil | 29/25.2 |
| 3,608,823 | 9/1971 | Buschor | 239/15 |
| 3,981,729 | 9/1976 | Saulnier | 96/36.1 |
| 4,331,712 | 5/1982 | Cohen et al. | 427/202 |
| 4,620,133 | 10/1986 | Morrell et al. | 315/15 |
| 4,746,589 | 5/1988 | Haneda et al. | 430/120 |
| 4,917,978 | 4/1990 | Ritt et al. | 430/23 |
| 4,921,767 | 5/1990 | Datta et al. | 430/23 |
| 5,012,155 | 4/1991 | Datta et al. | 313/461 |
| 5,028,501 | 7/1991 | Ritt et al. | |
| 5,034,775 | 7/1991 | Folkins | 355/259 |
| 5,083,959 | 1/1992 | Datta et al. | 445/52 |
| 5,093,217 | 3/1992 | Datta et al. | 430/28 |
| 5,132,188 | 7/1992 | Datta et al. | 430/26 |
| 5,151,337 | 9/1992 | Wetzel et al. | 430/28 |
| 5,229,233 | 7/1993 | Riddle et al. | 430/23 |
| 5,229,234 | 7/1993 | Riddle et al. | 430/28 |
| 5,306,786 | 4/1994 | Moehs et al. | 525/437 |
| 5,340,674 | 8/1994 | Moscehy et al. | 430/28 |
| 5,362,820 | 11/1994 | Moehs et al. | 525/438 |

FOREIGN PATENT DOCUMENTS

| | | | |
|---|---|---|---|
| 1535122 | 6/1968 | France . | |
| 1725006 | 9/1975 | Germany | H01J 9/22 |
| 1169455 | 5/1969 | United Kingdom | H01J 9/22 |

OTHER PUBLICATIONS

U.S. patent application Ser. No. 825,888, filed Jan. 27, 1992 by Ehemann, Jr.

*Primary Examiner*—Michael L. Gellner
*Assistant Examiner*—Nicholas J. Tuccillo
*Attorney, Agent, or Firm*—Joseph S. Tripoli; Dennis H. Irlbeck; Vincent J. Coughlin, Jr.

[57] ABSTRACT

In accordance with the present invention, an apparatus for developing a latent image formed on a photoreceptor, which is deposited on an interior surface of an output window of a display device, is disclosed. The developing apparatus includes a developing chamber, having a support surface for supporting the output window, a screen structure material reservoir for storing, deagglomerating and feeding the screen structure material, and a triboelectric gun assembly communicating with the reservoir. The gun assembly triboelectric charges and imparts a desired charge polarity to the screen structure material. The gun assembly further includes at least one material dispersing nozzle spaced from the support surface for distributing the charged material for deposition onto the latent image.

25 Claims, 3 Drawing Sheets

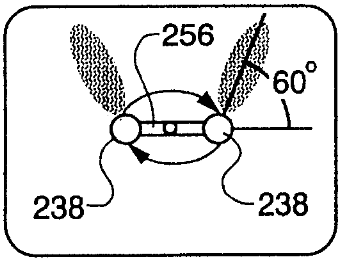
Fig. 5
Fig. 6
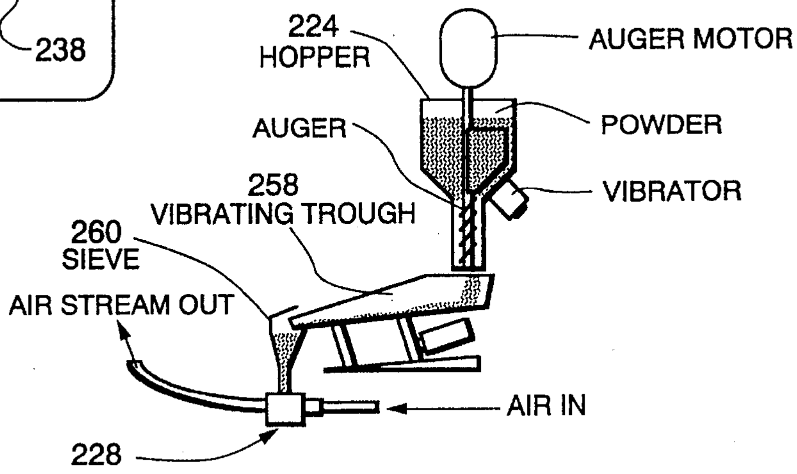
Fig. 7
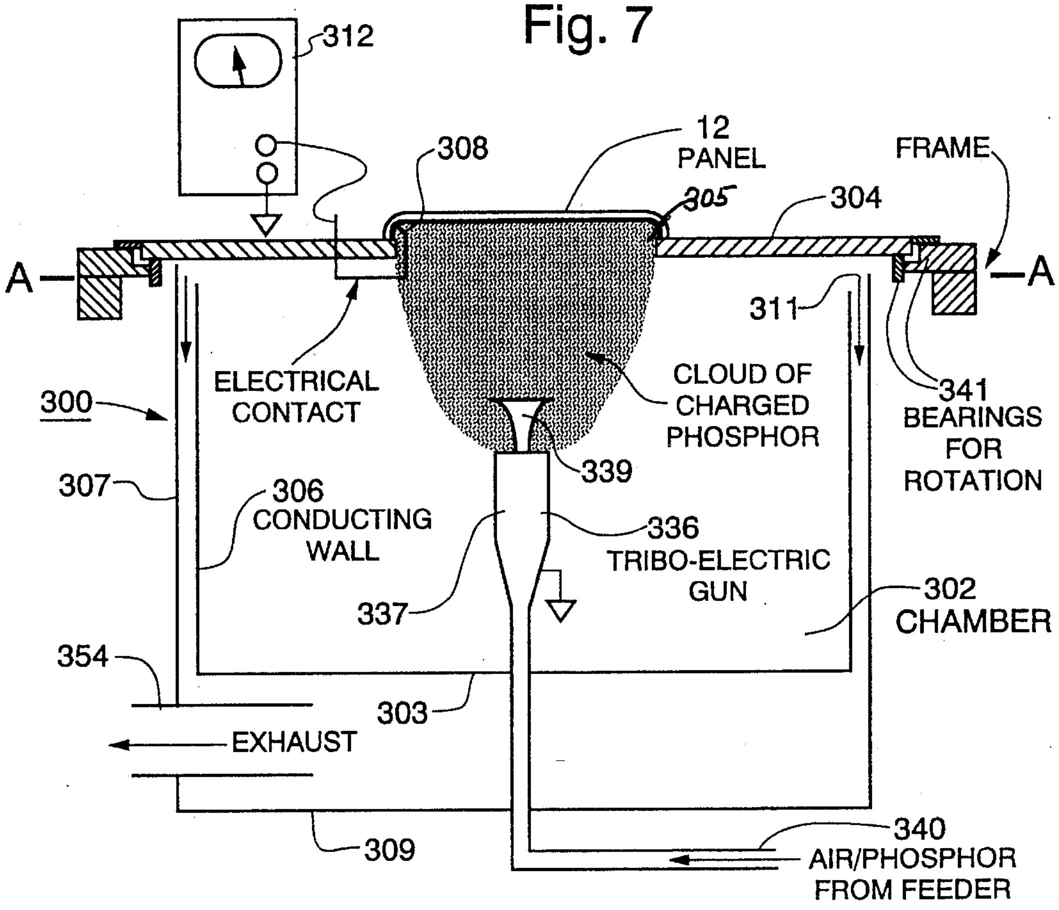

CRT DEVELOPING APPARATUS

The invention relates to an apparatus for developing a latent charge image formed on a photoreceptor which is disposed on an interior surface of an output window of a display device, such as a cathode-ray tube (CRT), and, more particularly, to a developer which provides a triboelectric charge of a desired polarity to the developing materials.

BACKGROUND OF THE INVENTION

U.S. Pat. No. 4,921,767, issued to Datta et al. on May 1, 1990, discloses a method for electrophotographically manufacturing a luminescent screen assembly on an interior surface of a CRT faceplate panel, using dry-powdered, triboelectrically-charged, screen structure materials deposited on a latent image formed on an electrostatically charged photoreceptor. The photoreceptor comprises a photoconductive layer overlying a conductive layer, both of which are deposited, serially, as solutions, on the interior surface of the CRT panel. In the aforementioned patent, the four developers utilized for depositing the screen structure materials are the so-called "powder cloud" developers of the type in which particles of screen structure materials are triboelectrically charged by contacting surface-treated carrier beads. The charged particles of screen structure materials are then expelled from the developers and onto the latent image. A drawback of this type of powder cloud developer is that it is unsuitable for manufacturing production quantities of luminescent screens, where the development time for depositing each of the different materials must be of the order of about 15 seconds for each material.

SUMMARY OF THE INVENTION

In accordance with the present invention, an apparatus for developing a latent image formed on a photoreceptor, which is deposited on an interior surface of an output window of a display device, is disclosed. The developing apparatus includes a developing chamber, having a support surface for supporting the output window, a screen structure material reservoir for storing, deagglomerating and feeding the screen structure material, and a triboelectric gun assembly communicating with the reservoir. The gun assembly includes triboelectric charging means for imparting a desired charge polarity to the screen structure material and at least one material dispersing means spaced from the support surface for distributing the charged material for deposition onto the latent image.

BRIEF DESCRIPTION OF THE DRAWINGS

FIG. 5 shows a top view of the material dispersing nozzles of the developing apparatus of FIG. 4.

FIG. 6 shows a second embodiment of a reservoir of the developer shown in FIG. 4.

FIG. 7 shows a second embodiment of the chamber of the novel developing apparatus.

DETAILED DESCRIPTION OF THE PREFERRED EMBODIMENTS

Figure 1:
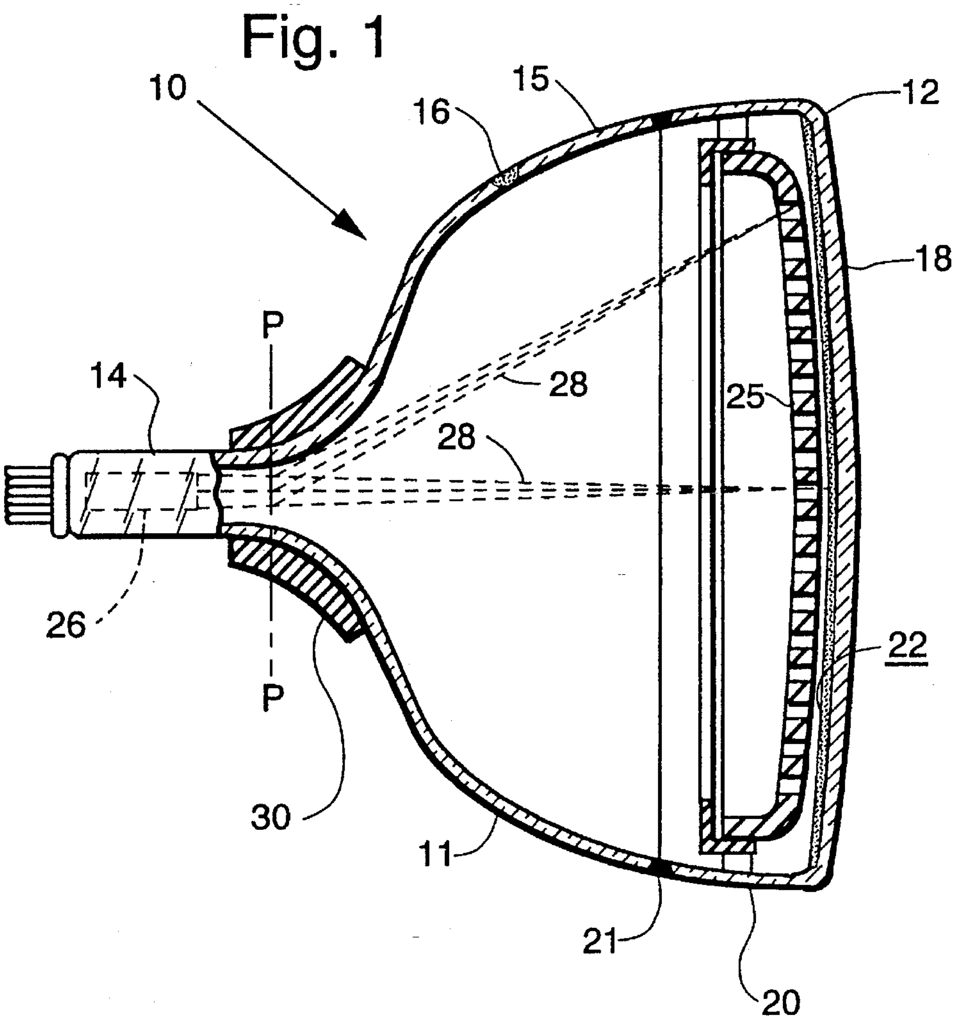
FIG. 1 is a plan view, partially in axial section, of a color CRT made according to the present invention.
Figure 2:
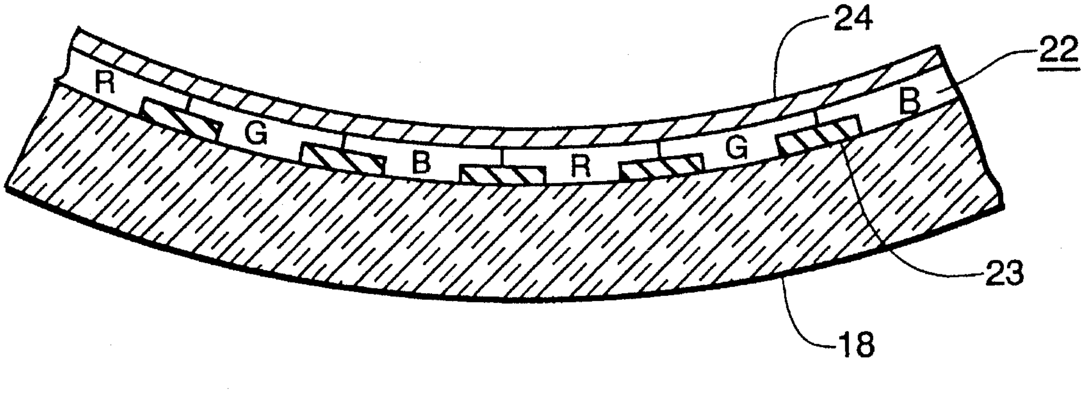
FIG. 2 is a section of a screen assembly of the tube shown in FIG. 1.

FIG. 1 shows a color display device, such as a CRT, 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate or substrate 18 and a peripheral flange or sidewall 20, which is sealed to the funnel 15 by a glass frit 21. A three color luminescent screen 22 is carried on the interior surface of the faceplate 18. The screen 22, shown in FIG. 2, preferably is a line screen which includes a multiplicity of screen elements comprised of red-emitting, green-emitting and blue-emitting phosphor stripes, R, G and B, respectively, arranged in color groups or picture elements of three stripes, or triads, in a cyclic order and extending in a direction which is generally normal to the plane in which impinging electron beams are generated. In the normal viewing position for this embodiment, the phosphor stripes extend in the vertical direction. Preferably, the phosphor stripes are separated from each other by a light-absorptive matrix material 23, as is known in the art. Alternatively, the screen can be a dot screen. A thin conductive layer 24, preferably of aluminum, overlies the screen 22 and provides a means for applying a uniform potential to the screen as well as for reflecting light, emitted from the phosphor elements, through the faceplate 18. The screen 22 and the overlying aluminum layer 24 comprise a screen assembly.

Again with respect to FIG. 1, a multi-apertured color selection electrode, or shadow mask, 25 is removably mounted, by conventional means, in predetermined spaced relation to the screen assembly. An electron gun 26, shown schematically by the dashed lines in FIG. 1, is centrally mounted within the neck 14, to generate and direct three electron beams 28 along convergent paths through the apertures in the mask 25, to the screen 22. The gun 26 may, for example, comprise a bi-potential electron gun of the type described in U.S. Pat. No. 4,620,133, issued to Morrell et al. on Oct. 28, 1986, or any other suitable gun.

The tube 10 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically in a rectangular raster over the screen 22. The initial plane of deflection (at zero deflection) is shown by the line P—P in FIG. 1., at about the middle of the yoke 30. For simplicity, the actual curvatures of the deflection beam paths in the deflection zone are not shown.

The screen 22 is manufactured by the electrophotographic screening (EPS) process that is described in U.S. Pat. No. 4,921,767, cited above. Initially, the panel 12 is washed with a caustic solution, rinsed with water, etched with buffered hydrofluoric acid and rinsed again with water, as is known in the art. The interior of the viewing faceplate 18 is then coated with a photoreceptor (not shown) comprising a suitable layer of conductive material which provides an electrode for an overlying photoconductive layer.

In order to form the matrix by the EPS process, the photoconductive layer is charged to a suitable potential within the range of +200 to +700 volts, using a corona charger of the type described in U.S. Pat. No. 5,083,959, issued to Datta et al. on Jan. 28, 1992, which is incorporated by reference herein for the purpose of disclosure. The shadow mask 25 is inserted into the panel 12 and the positively charged photoconductive layer is exposed, through the shadow mask 25, to light from a xenon flash lamp, or other light source of sufficient intensity, such as a mercury arc, disposed within a conventional three-in-one lighthouse. After each exposure, the lamp is moved to a different position to duplicate the incident angles of the electron beams from the electron gun. Three exposures are required, from the three different lamp positions, to discharge the-areas of the photoconductive layer where the light-emitting phosphors subsequently will be deposited to form the screen. After the exposure step, the shadow mask 25 is removed from the panel 12 and the panel is moved to a first developer, described hereinafter, which contains suitably prepared, dry-powdered particles of a light-absorptive black matrix screen structure material. The matrix material is triboelectrically negatively charged by the developer. The negatively charged matrix material may be directly deposited in a single step, as described in above-cited U.S. Pat. No. 4,921,767, or it may be directly deposited in two steps, as described in U.S. Pat. No. 5,229,234, issued to Riddle et al. on Jul. 20, 1993, and incorporated by reference herein for the purpose of disclosure. The "two step" matrix deposition process increases the opacity of the matrix by providing for the selectively discharging, once again, of the exposed areas of the photoconductive layer, to enhance the voltage contrast between the exposed and unexposed areas of the layer. The first matrix layer acts as a mask which provides a shadowing effect to prevent the discharge of the underlying portions of the photoconductive layer when the photoconductive layer is exposed, a second time, to light from, for example, a flood light. The second layer of negatively charged matrix material is deposited over the first layer to provide greater density of the resultant matrix than is possible with only one matrix layer.

It also is possible to form a matrix using a conventional wet matrix process of the type known in the art and described, for example, in U.S. Pat. No. 3,558,310, issued to Mayaud on Jan. 26, 1971 and incorporated by reference herein for disclosure purposes. If the "wet" process of U.S. Pat. No. 3,558,310 is utilized, a photoreceptor is not provided after the initial cleaning of the interior surface panel. Instead, a film of a suitable photoresist, whose solubility is altered when exposed to light, is used. The resist film is exposed in the manner described above using a three-in-one lighthouse with light incident on the resist film through the shadow mask 25. The regions of the film with greater solubility are removed by flushing the exposed film with water, thereby exposing bare areas of the faceplate panel. The interior surface of the panel is overcoated with a black matrix slurry, of a type known in the art, which is adherent to the exposed areas of the faceplate panel. The matrix material overlying the retained film regions is removed, leaving a matrix layer on the previously open areas of the panel.

Figure 3:
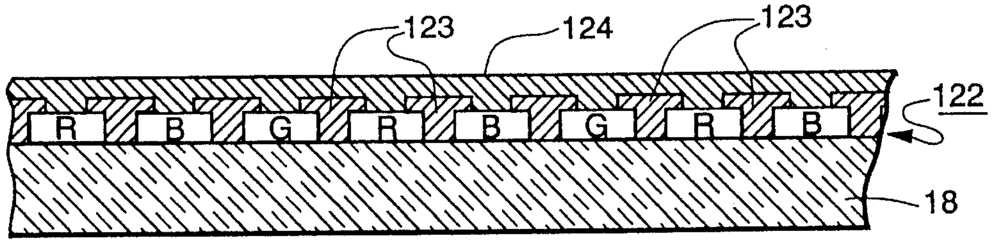
FIG. 3 is a section of an alternative embodiment of a screen assembly of the tube shown in FIG. 1.

As an alternative to both of the above-described "matrix first" processes, the matrix can be electrophotographically applied after the phosphors are deposited by the EPS process. This "matrix last" process is described in U.S. Pat. No. 5,240,798, issued to Ehemann, Jr. on Aug. 31, 1993, FIG. 3 herein shows a screen assembly made according to the "matrix last" process of U.S. Pat. No. 5,240,798. The red-, blue- and green-emitting phosphor elements, R, B, and G, are formed by serially depositing triboelectrically positively charged particles of phosphor screen structure materials onto a positively charged photoconductive layer of the photoreceptor (not shown). The charging process is the same as that described above and in above-cited U.S. Pat. No. 5,083,959.

The charged layer is discharged by installing the shadow mask 25 into the panel 12 and placing the panel onto a lighthouse where the xenon flash lamp is located in a position which approximates the incident angle of the electron beam incident on the particular color-emissive phosphor. Three lighthouses are required for phosphor deposition, one for each color-emissive phosphor. After the photoconductive layer is discharged by light incident thereon through the apertures in the shadow mask, the mask is removed from the panel and the panel is located on a developer, such as the developer described hereinafter. Phosphor screen structure particles are triboelectrically charged and distributed by the developer, and are deposited, by reversal development, onto the discharged areas of the photoconductive layer. "Reversal" development means that triboelectrically-charged particles of screen structure material are repelled by similarly charged areas of the photoconductive layer and, thus, deposited onto the discharged areas of the photoconductive layer. After the three phosphors are deposited, the photoconductive layer is again uniformly charged to a positive potential and the panel, containing the aforedeposited phosphor elements, is disposed on a matrix developer which provides a triboelectrically negative charge to the matrix screen structure material. The positively charged open areas of the photoconductive layer, separating the phosphor screen elements, are directly developed by depositing onto the open areas the negatively charged matrix materials, to form the matrix 123. This process is called "direct" development. An aluminum layer 124 is provided on the screen 122. It should be appreciated that the screen-making process described above, can be modified by reversing both the polarity of the charge provided on the photoconductive layer and the polarity of the triboelectric charge induced on the screen structure materials, to achieve a screen assembly identical to that described above.

Figure 4:
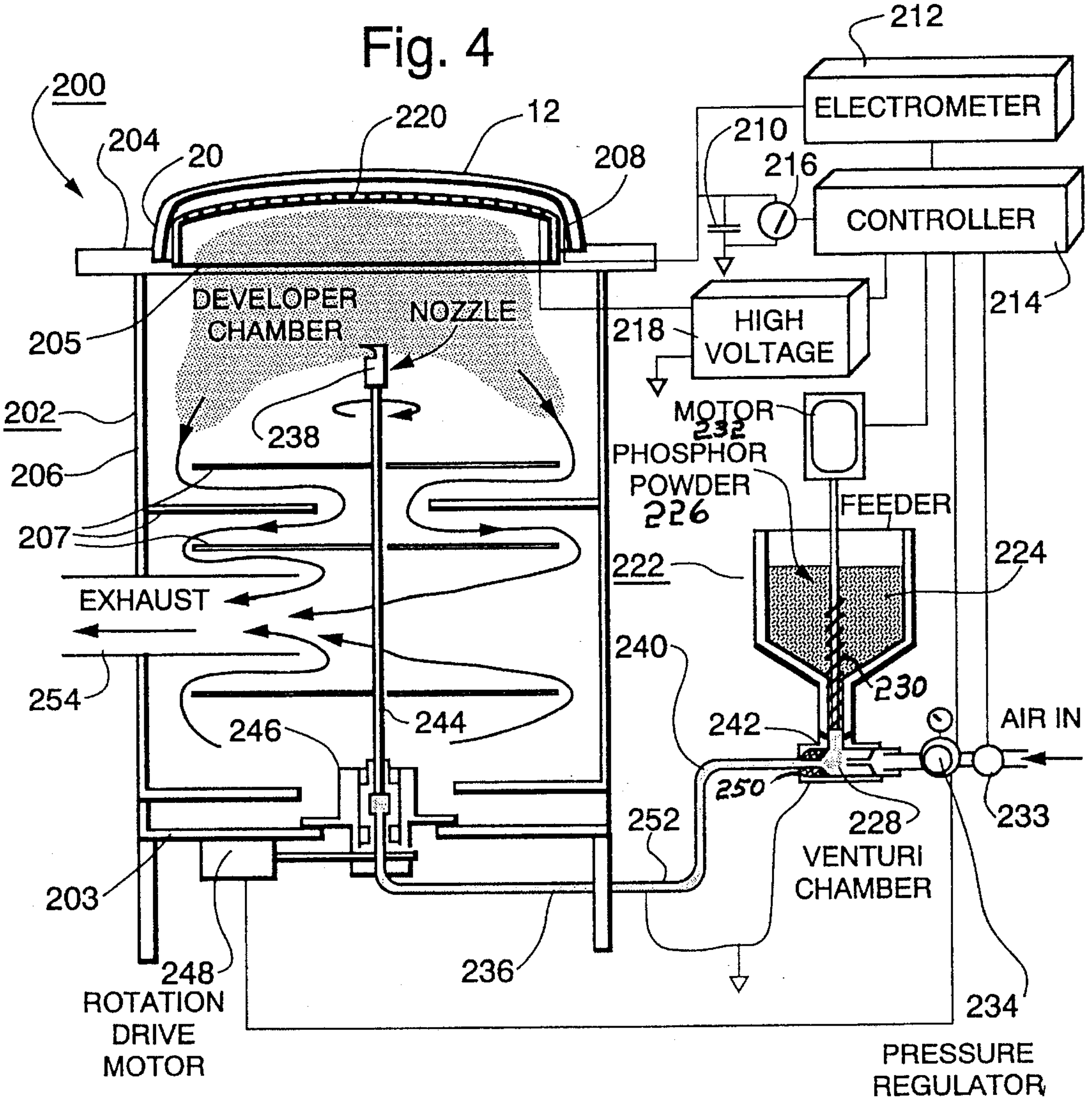
FIG. 4 shows a first embodiment of a novel developing apparatus for developing a latent image on a photoreceptor, to form a luminescent screen assembly for a CRT.

One embodiment of a novel developing apparatus is shown in FIGS. 4–6. With respect to FIG. 4, the developing apparatus 200 comprises a developing chamber 202 having a bottom end and a top end. Bottom supports 203 are structured to permit some air flow into the developer. A panel support 204, having an opening 205 therethrough which is slightly smaller in dimensions than the CRT faceplate panel 12 which is supported thereon, closes the top end of the developer. The panel support 204 is preferably formed of an insulative plastic material, such as plexiglas, and has an outside dimension greater than that of the insulating sidewalls 206 of the developing chamber 202 which extends between the bottom supports 203 and the panel support 204. The chamber 202 is preferably rectangular, and has a diagonal dimension about 25% greater than that of the panel 12. A plurality of baffles 207 are secured to the sidewall 206, for a purpose described hereinafter. The panel support 204 includes a conductive stud contact spring 208 which biases a conventional stud (not shown) embedded in the panel sidewall 20, that retains the shadow mask within the panel during operation of the CRT, and which is connected to the conductive layer of the photoreceptor (also not shown). A conductive contact patch (not shown), which facilitates the interconnection of the conductive layer of the photoreceptor and the stud, is described in U.S. Pat. No. 5,151,337, issued on Sep. 29, 1992 to Wetzel et al., which is incorporated by reference herein for the purpose of disclosure. The stud contact spring 208 is, in turn, connected to through a grounding capacitor 210, which develops a voltage proportional to the charge of the triboelectrically-charged phosphor particles deposited on the latent image formed on the photoconductive layer of the photoreceptor. The voltage developed on the capacitor 210 is monitored by an electrometer 212 that is connected to a controller 214, which is programmed to stop the development when this voltage reaches a predetermined value that corresponds to the required phosphor thickness. Prior to each development cycle, the voltage on the capacitor 210 is discharged to ground through contacts 216, by the action of the controller 214. A high voltage source 218 is connected to a grid 220 to control the electric field in the vicinity of the latent image formed on the photoconductive layer disposed on the interior surface of the CRT panel 12. Without the grid 220, the electric field in the vicinity of the latent image could be raised to an excessive value by the space charge in the phosphor distribution and by charged particles collected on the insulating sidewalls of the chamber. The grid 220 and its operation are described in U.S. Pat. No. 5,093,217, issued on Mar. 3, 1992 to Datta et al. and incorporated by reference herein for the purpose of disclosure. The grid 220 is biased at about 3 kV and has the same polarity as that of the triboelectrically-charged material being deposited in the developing apparatus 200.

A separate developer is required for each of the three color emissive phosphors, to prevent cross contamination which would occur if a single phosphor developer were utilized and different color emitting materials fed into a common chamber. Accordingly, in the EPS manufacturing process, three phosphor developers, each with its own material reservoir 222, are required. In addition, if the matrix is formed by the EPS process, yet another developer for the matrix material is required. The reservoir 222 includes a feeder hopper 224 which contains a supply of dry-powdered phosphor material 226. Preferably, the phosphor particles are surface treated, as described in U.S. Pat. No. 5,012,155, issued on Apr. 30, 1991 to Datta et al., with a suitable polymeric material to control the triboelectric charge characteristics thereof. During the developing operation, the phosphor particles of the color emitting phosphor being deposited onto the latent image are transported from the feeder hopper 224 to a venturi chamber 228 by means of an auger 230, having a stirrer (not shown) attached thereto, extending vertically through the feeder hopper. A motor 232 drives the auger in response to a command generated by the controller 214. The stirrer, attached to the auger, deagglomerates the phosphor particles and levels the phosphor particles within the feeder hopper, which controls the quantity of phosphor particles passing into the venturi chamber, where they are mixed with a suitable quantity of air. The actuation of the air supply is accomplished by opening a valve 233 controlled by the controller 214. The air pressure is set by a pressure regulator 234. Typically, the phosphor particles are mixed into the air stream at a rate of about 1 to 10 g/minute.

A triboelectric gun assembly 236 comprises at least one gun nozzle 238 and a triboelectric charging element including a charging tube 240. The gun nozzle 238 is spaced from the panel support 204 and provides a distribution of triboelectrically positively-charged phosphor particles which are deposited and develop the latent image formed, on the photoconductive layer of the photoreceptor. As shown in FIG. 4, the charging element comprises the tube 240 extending from the output end 242 of the venturi chamber 228 to a rigid nozzle support tube 244 mounted within a rotatable coupler 246 that extends through the bottom supports 203. The rotatable coupler 246 is driven by a rotation drive motor 248. The charging tube 240 is made of a material that will impart a positive triboelectric charge to the phosphor particles passing therethrough and coming in contact with the interior surface thereof. Polypropylene, polyethylene, fluorinated siloxane, polyfluorinatedmethacrylate, polyvinylchloride (PVC) and a synthetic resin polymer, such as polytetrafluoroethylene, available as TEFLON (a trademark of the E. I. DuPont Co., Wilmington, Del.), are suitable materials; however, polypropylene is preferred. A charge booster 250 also may be utilized in conjunction with a charging tube made of polypropylene, polyethylene or PVC. The booster 250 comprises a section of TEFLON tubing having a diameter of about 6.35 mm (0.25in) and a length of about 25.4 to 76.2 mm (1.0 to 3.0in). Preferably the booster is located at the output of the venturi chamber and not more than about 3 meters (about 10 feet) from the nozzle 238. A conductive coating 252, such as graphite paint, is provided on the exterior surface of the charging tube 240. The coating 252 is grounded to provide a return path for the small current replacing the charge withdrawn by the phosphor.

An exhaust port 254 extends through the sidewall 206 of the developing chamber 202 and into the volume between spaced apart layers of the baffles 207 to remove excess phosphor material that is not deposited onto the latent image on the interior surface of the faceplate panel 12. The exhaust port 254 is mounted toward the bottom of the chamber 202 and within the baffles 207 to prevent turbulance, developed by the exhaust, from disturbing the phosphor distribution in the vicinity of the panel. The location of the exhaust port 254 within the baffles also ensures that it does not compete with the latent image for the phosphor material. An exhaust pump (not shown) removes the excess phosphor material from the chamber 202.

While at least one gun nozzle 238 is required for the triboelectric gun assembly 236, two nozzles spaced about 127 mm (5 in.) apart and lying in a plane about 178 mm. (7 in.) below the seal edge i.e., the lower edge, of the panel 12 are preferred. As shown in FIG. 5, the nozzles 238 are secured to opposite ends of a rotatable tubular arm 256, which is attached to the top end of the rigid nozzle support tube 244, and feeds phosphor material to the nozzles. Preferably, the output spray of each of the nozzles is directed at an angle of about 60° from the radial extension of the arm 256, to ,provide more complete coverage of the entire latent image as the arm 256 rotates about the longitudinal axis of the developer in response to the rotation drive motor 248. Typically, ten revolutions of the arm 256 are required for the development cycle, and the air flow, as regulated by the pressure regulator 234, is about 100 liters per minute.

To further assist in the deagglomeration of the phosphor particles, a vibrating trough 258 and a sieve 260, having openings appropriate to the size of the phosphor particles, e.g., 100 mesh, may be provided as shown on FIG. 6, between the feeder hopper 224 and the venturi chamber 228.

A developer for depositing matrix material on the latent image is similar to the above-described phosphor developer; however, because the matrix screen structure material is triboelectrically negatively charged for direct development onto a positively charged photoconductive layer, the material composition of the charging tube must be different from the materials described above. To provide a negative triboelectric charge to the matrix material, the charging tube 240 may comprise nylon, polyurethane, plexiglas, epoxy resin, aminosiloxane, borosilicate glass and other materials with a positive triboelectric potential, nylon being preferred. The exterior surface of the charging tube also is coated with conductive paint, such as graphite, as described above.

A second embodiment of the novel developing apparatus is shown in FIG. 7. The developing apparatus 300 includes an interior developing chamber 302, which is cylindrical, and has a diameter about 50% larger than the diagonal dimension of the panel 12. The chamber 302 is closed at one end by a conductive bottom support 303 and at the other end by a panel support 304 made of suitable insulating material, such as plexiglas, having an opening 305 therethrough which is slightly smaller in dimensions than the CRT faceplate panel 12 which is supported thereon. A conducting sidewall 306 extends from the bottom 303 to a plane A—A adjacent to the panel support 304 and attracts excess phosphor out of the powder cloud, preventing a buildup of space charge within the chamber, or of a high electrostatic potential on the chamber wall. Under these conditions, it is not necessary to include a grid facing the interior of the panel 12, to control the electric field in the vicinity of the panel surface. An exterior chamber encloses the bottom 303 and sidewall 306 of the interior chamber. The exterior chamber includes a sidewall 307 which extends from an outer bottom support 309 to the panel support 304. A gap 311, located at the top periphery of the chamber and between the interior chamber and the exterior chamber, provides a path to remove excess screen structure material that is not deposited on the latent image formed on the photoconductive layer on the interior surface of the faceplate panel 12 or collected on the chamber sidewall 306 or bottom support 303. The location of the exhaust gap 311 at the top periphery of the chamber 302 causes screen structure material to be drawn outward toward the corners of the panel 12, thereby increasing the density of the deposit in the corners and enhancing screen uniformity. An exhaust port 354 is connected to a pump (not shown) which removes the excess material from the chamber.

An electrical contact 308, similar to that described with respect to the first embodiment, is provided to contact the conductive coating (not shown) of the photoreceptor. The monitoring means is schematically shown as an electrometer 312; however, this is merely illustrative of a means for determining the amount of charge material deposited on the panel, and terminating means including a controller, similar to controller 214 and its control circuitry, may be used. The developing apparatus 300 differs from the apparatus 200 in that the second embodiment includes a triboelectric gun 336 made of suitable material to directly provide a triboelectric charge on the materials passing between an exterior surface 337 of the gun and a centrally located deflector 339. The particles are charged by contacting either or both of the gun components 337 and 339, which may be formed of polypropylene, polyethylene, polyvinylchloride, fluorinated siloxane, polyfluorinatedmethacrylate and polytetrafluroethylene to provide a positive charge to the phosphor particles, or of nylon, polyurethane, plexiglas, epoxy resin and borosilicate glass to provide a negative charge to matrix particles. Since the triboelectric charging of the screen structure materials occurs directly in the gun 336, there is no need for an external charging tube, and the output end 242 of the venturi chamber, described with respect to FIG. 4, may be fed directly into the input line 340. The gun 336 or the input line 340 is suitably grounded. The triboelectric gun 336 may be stationary, in which case a set of rotation bearings 341 is provided on the panel support 304 to facilitate rotation of the entire support, and the panel 12, through at least 180°. Alternatively, the panel support 304 may remain stationary, in which case the triboelectric gun 336 is rotated about its longitudinal axis to provide uniform distribution of the screen structure materials on the latent charge image.

What is claimed is:

1. An apparatus for developing, with suitably triboelectrically-charged, dry-powdered, screen structure material, an electrostatic latent image formed on a photoreceptor which is disposed on an interior surface of a faceplate panel of a CRT, said apparatus comprising a developing chamber having a panel support for supporting said faceplate panel, an electrical contact which contacts said photoreceptor, monitoring means communicating with said electrical contact, to measure the amount of charge being deposited onto said latent image by said charged screen structure material, terminating means, responsive to said monitoring means, for terminating the deposition of said charged screen structure material at a predetermined charge corresponding to a desired thickness of said material, a screen structure material reservoir including a feeder hopper for storing said screen structure material, an auger for transporting said material from said feeder hopper to a venturi chamber, means for deagglomerating and feeding said material, and a triboelectric gun assembly within said developing chamber communicating with said venturi chamber and having triboelectric charging means for imparting a desired charge polarity to said screen structure material, said gun assembly having means spaced from said panel support for distributing said charged screen structure material for deposition onto said latent image.

2. The apparatus as described in claim 1, further including a grid located in proximity to said interior surface of said faceplate panel to control the electric field from the latent image.

3. The apparatus as described in claim 1, further including a vibrating trough and a sieve disposed between said feeder hopper and said venturi chamber to further deagglomerate said material and transport said material to said venturi chamber.

4. The apparatus as described in claim 1, wherein said means for distributing said charged screen structure material comprises at least one nozzle.

5. The apparatus as described in claim 1, wherein said means for distributing said charged screen structure material comprises a deflector.

6. The apparatus as described in claim 1, wherein said monitoring means comprises a grounding capacitor connected across a pair of contacts which are connected at one end to ground and at the other end to said electrical contact and to an electrometer.

7. The apparatus as described in claim 6, wherein said terminating means includes a controller, connected to said monitoring means, that terminates the deposition of said screen structure material when a predetermined voltage, proportional to the charge deposited by said triboelectrically-charged screen structure material on said latent image formed on said photoreceptor, is developed across said grounding capacitor.

8. The apparatus as described in claim 1, further including a cabinet enclosing the side and bottom of said developing chamber, the top thereof being at least partially closed by said insulative support surface.

9. The apparatus as described in claim 8, wherein said cabinet is made of an insulating material.

10. The apparatus as described in claim 8, wherein said cabinet is made of a conductive material, is cylindrically-shaped and has a diameter about 50% larger than the diagonal dimension of said faceplate panel.

11. The apparatus as described in claim 10, wherein said cabinet further includes exhaust means to remove excess screen structure material not deposited onto said latent image.

12. The apparatus as described in claim 1, wherein said triboelectric charging means includes a charging tube.

13. The apparatus as described in claim 12, wherein said charging tube is selected from the group of materials consisting of nylon, polyurethane, plexiglas, epoxy resin, aminosiloxane, and borosilicate glass to provide a negative charge to said material.

14. The apparatus as described in claim 12 further including a triboelectric charge booster utilized in conjunction with said charging tube.

15. The apparatus as described in claim 14, wherein said charge booster comprises a section of polytetrafluroethylene tubing.

16. The apparatus as described in claim 12, wherein said charging tube is selected from the group of materials consisting of polypropylene, polyethylene, polyfluorinated-methacrylate, fluorinated siloxane, polyvinylchloride and polytetrafluroethylene to provide a positive charge to said material.

17. The apparatus as described in claim 16, wherein the exterior surface of said charging tube includes a conductive coating which is grounded.

18. The apparatus as described in claim 17, wherein said conductive coating comprises a graphite paint.

19. The apparatus as described in claim 1, further including means for providing relative movement between said panel and said triboelectric gun assembly.

20. The apparatus as described in claim 19, wherein said insulative support surface is rotatable relative to said triboelectric gun assembly.

21. The apparatus as described in claim 19 wherein said triboelectric gun assembly rotates to distribute said screen structure material onto said latent image.

22. The apparatus as described in claim 19, wherein said nozzle of said triboelectric gun assembly rotates to distribute said screen structure material onto said latent image.

23. The apparatus as described in claim 22, wherein said gun assembly includes two nozzles attached to a rotatable tubular arm oriented about a longitudinal axis normal to the surface of said panel, whereby said material is ejected from said nozzles in a generally radial direction.

24. The apparatus as described in claim 23, wherein said nozzles are spaced apart and the material is ejected into a radial plane at an angle of about 60° from the radial direction.

25. The apparatus as described in claim 23, further including a rotatable coupler disposed between said rotatable tubular arm and said charging tube.

* * * * *

UNITED STATES PATENT AND TRADEMARK OFFICE
CERTIFICATE OF CORRECTION

PATENT NO. : 5,477,285
DATED : December 19, 1995
INVENTOR(S) : George H.N. Riddle et al.

It is certified that error appears in the above-identified patent and that said Letters Patent is hereby corrected as shown below:

Col. 2, line 37, after "paths" add --,--.

Col. 3, line 59, after "1993" change "," to --.--.

Col. 4, line 63, delete "through"

Col. 6, line 41, delete "," before "provide".

Col. 6, line 50, before "as" add --,--.

Col. 7, line 51, change "Since" to --In as much as--.

Signed and Sealed this

Fourteenth Day of May, 1996

Attest:

Bruce Lehman

BRUCE LEHMAN

*Attesting Officer* *Commissioner of Patents and Trademarks*